United States Patent [19]

Frost

[11] 4,048,513

[45] Sept. 13, 1977

[54] RECTIFIER CONTROLLED CIRCUIT

[75] Inventor: Robert F. Frost, Severna Park, Md.

[73] Assignee: The United States of America as represented by the Secretary of the Army, Washington, D.C.

[21] Appl. No.: 714,416

[22] Filed: Aug. 16, 1976

[51] Int. Cl.² .............................................. H05B 1/02
[52] U.S. Cl. ..................................... 307/28; 219/483; 307/56
[58] Field of Search ..................... 307/28, 26, 25, 18, 307/56, 55, 53; 219/483, 485, 486, 487, 497, 501

[56] References Cited

U.S. PATENT DOCUMENTS 4,011,430    3/1977    Witkin et al. ........................ 219/483

Primary Examiner—Herman J. Hohauser
Attorney, Agent, or Firm—William G. Gapcynski; H. M. Hougen; Lawrence A. Neureither

[57] ABSTRACT

An electrical circuit providing for equal power consumption by the included load elements when selectively energized by independent power sources of differing voltages, through control of the path of current flow through the load elements by rectifiers, the rectifiers being disposed to permit current flow in a direction through the load elements in series when a high voltage source energizes the circuit through one pair of terminals and, without alteration of the circuit, in parallel through the load elements when a low voltage source energizes the circuit through another pair of terminals.

9 Claims, 2 Drawing Figures

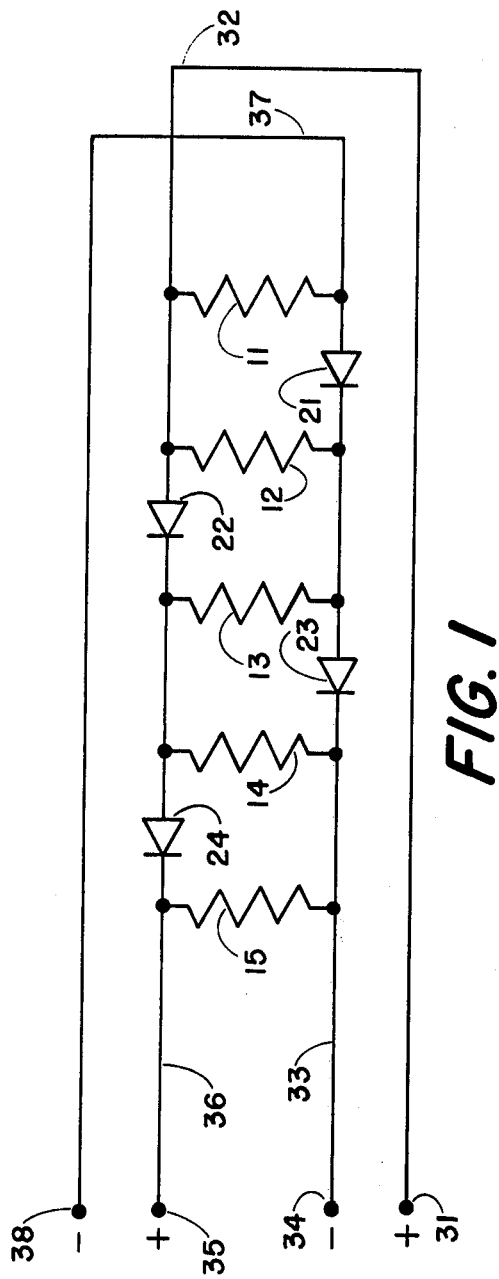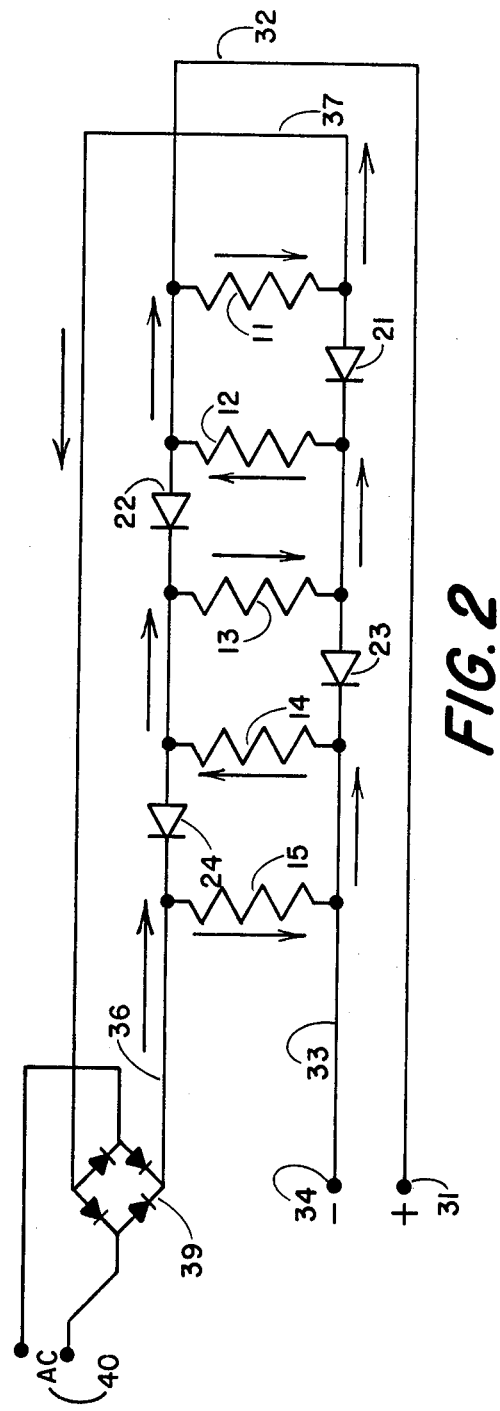

RECTIFIER CONTROLLED CIRCUIT

BACKGROUND OF THE INVENTION

1. Field of the Invention

The invention is in the field of electric heating of a closed, controlled environment by heating elements of equal value which are required to consume approximately equal power when selectively energized by independent power sources of differing voltages without altering the electrical connection of the heating elements.

2. Description of the Prior Art

Prior efforts to make an electric heating system compatible with alternative power sources of differing voltage have included the use of transformers, phase control devices, and dual networks of resistors. The use of a transformer substantially increases the weight, size, and cost of the system. Phase control methods increased the size and cost of the system, resulted in less efficient use of the power, and created radio frequency interference with nearby radio and electronic equipment. A dual network of resistors doubled the size and cost of the heating elements. The present invention avoids such increased size, cost, weight, inefficiency, and interference; it also eliminates the need for switches or other active components to change the circuit configuration of the resistors, other than means to connect the different power sources to the circuit.

SUMMARY OF THE INVENTION

The present invention concerns an electrical circuit for a device, such as an electrically heated shipping and storage container capable of use with alternative power sources of differing voltage magnitude, when it is desirable that the included resistors consume a similar amount of when energized by independent, alternative power sources. A number of equal load elements, such as resistors sufficient in number and capacity to provide adequate heat to the interior of the container, are connected in parallel to a pair of conductive leads in an electrical circuit. A number of rectifiers, such as diodes, totaling one fewer than the number of load elements, are placed in a forward-biased condition between adjacent load elements so that the rectifiers are alternately located in the conductive leads between the terminals of the load elements. Electrical input and output connectors accommodate the various power sources which independently and alternatively energize the circuit. When only low voltage direct current passes through the circuit from one set of input and output connectors through the rectifiers in their forward biasing direction, the load elements are in parallel. When only a high voltage direct current passes through the circuit from another set of input and output connectors in the opposite direction the rectifiers are reverse biased and current is forced by the rectifiers to flow through the load elements in series. The amount of power drawn from a given power source, and therefore the amount of heat produced by a circuit of several heating elements, is dependent upon the path of the current through the resistors or other load elements. When the voltage ratio between the high and low voltage sources is equal to the number of equal load elements, the amount of power consumed is also equal.

While a heating system is used as the basis of discussion, the invention is equally applicable to other devices requiring a capability of drawing a relatively similar amount of power selectively from any of several independent, alternative power sources, such as devices with emergency, back-up battery or generator power supply. No switches, active components, or duplicate circuits are required.

It is a primary object of the invention to provide an electrical circuit having equal value power-consuming elements capable of equal power consumption when selectively energized by independent power sources supplying differing voltages without changing the connection of the power consuming elements in the electrical circuit.

It is also an object of the invention to provide an electrical circuit having equal value power-consuming elements wherein the current flow path through such power-consuming elements is controlled by unidirectional current flow devices permitting equal power consumption by the equal value power-consuming elements when energized by independent power sources supplying differing voltages without changing the connection of the power-consuming elements in the electrical circuit.

It is also an object of the invention to provide an electrical circuit having equal value power-consuming elements capable of equal power consumption when selectively energized by independent power sources supplying differing voltages without changing the connection of the power-consuming elements, the differing voltages having a ratio equal to the number of power-consuming elements.

It is a further object of the invention to provide an electrical circuit having equal value power-consuming elements energized by independent power sources supplying differing voltages wherein the equal value power-consuming elements consume equal power at differing voltage input by control of current flow by rectifier devices connected to the power-consuming elements effecting the sequence of current flow through the power-consuming elements without changing connection of the power-consuming elements in the electrical circuit.

It is a further object of the invention to provide an electrical circuit having equal value load elements and interconnected rectifiers energized by independent power sources supplying differing voltages to the circuit wherein the forward and reverse biasing of the rectifiers is utilized to control the sequence of current flow through the load elements varying the circuit resistance to permit equal power consumption by the load elements commensurate with the magnitude of the voltage applied to the circuit.

It is a further object of the invention to provide and electrical circuit having equal value load elements and interconnected rectifiers energized by independent power sources supplying differing voltages to the circuit wherein the load elements present a low circuit resistance to low magnitude applied voltage and high resistance to high magnitude applied voltage through utilization of forward and reverse biasing of the rectifiers to control the sequence of current flow through the load elements to permit equal power consumption by the load elements for differing applied voltages to the circuit.

It is also an object of the invention to heat a storage container by providing an electrical circuit including equal value electrical heater elements wherein the current flow path through such heater elements is controlled by unidirectional current flow devices permitting equal power consumption by the equal value heater elements when energized by independent power sources supplying differing voltages without changing the connection of the heater elements in the electrical circuit.

BRIEF DESCRIPTION OF THE DRAWINGS

FIG. 1 is a schematic diagram of one embodiment of the circuit described herein.

FIG. 2 is a schematic diagram of the embodiment of FIG. 1 when connected to a high voltage alternating current power source.

DESCRIPTION OF THE PREFERRED EMBODIMENT

As shown in FIG. 1, five resistors 11, 12, 13, 14, 15 are connected to a first positive terminal 31 and a first negative terminal 34. When only those first terminals are connected to and energized by a direct current power source, electric current flows in a first direction from the first positive terminal 31, through a first positive lead 32, through the five resistors 11, 12, 13, 14, 15 in a parallel circuit, through a first negative lead 33, and out through the first negative terminal 34. Four diodes 21, 22, 23, 24 are forward biased in that first direction between adjacent resistors and alternately located in leads connecting the same side of each resistor; they present a low resistance to the direction of flow of the current and permit the current to flow through the resistors in parallel.

If the resistors selected are equal to each other in resistance and each resistor has a resistance R, the equivalent resistance in this parallel circuit can be computed as follows:

$$1/R_{eq} = 1/R_{11} + 1/R_{12} + 1/R_{13} + 1/R_{14} + 1/R_{15} = 5/R$$

When that parallel circuit is connected to a 24-volt direct current power source, the power consumed by the five resistors can be computed as follows:

$$P = V^2/R_{eq} = (24)^2 \times (5/R) = 2880/R$$

The resistors 11, 12, 13, 14, 15 are also connected as shown in FIG. 1 to a second positive terminal 35 and a second negative terminal 38. When only the second pair of terminals 35, 38 are connected to and energized by a second, alternative direct current power source, electric current flows in a second direction through the five resistors 15, 14, 13, 12, 11 in series. The location of the diodes in the leads between adjacent resistors, alternatively located in the leads connecting the same side of each resistor, and the reverse bias of the diodes with respect to this second direction prevents the current from flowing through the resistors in parallel. Thus, the current flows in this second direction from the second positive terminal 35, through a second positive lead 36, through the resistors 15, 14, 13, 12, 11 in series relation, through the second negative lead 37, and out through the second negative terminal 38.

The equivalent resistance for this series circuit, which includes the same resistors as the parallel circuit, can be computed as follows:

$$R_{eq} = R_{11} + R_{12} + R_{13} + R_{14} + R_{15} = 5R$$

When such series circuit is connected to a 120-volt direct current power source, the power consumed by the five resistors can be computed as follows:

$$P = V^2/R_{eq} = (120)^2/5R = 2880/R$$

FIG. 2 illustrates such a series circuit in operation when the second positive lead 36 and second negative lead 37 of the circuit are connected through a diode rectifier bridge 39 to a power source 40 such as a 120-volt alternating current source. The alternating current is rectified by the bridge 39 and passes into the second positive lead 36 as direct current. The flow of the direct current in the second direction is shown by the arrows.

The total amount of power drawn by the combined resistors in FIG. 1 from each of the two differing power sources is the same, even though the voltage differs. Similarly, is the resistors are heating elements, the total heat produced in each instance is the same.

A similar comparative result will obtain whenever the number of load elements having equal resistance equals the ratio between the voltage of a higher voltage power source and the voltage of a lower voltage power source. The higher voltage power source is normally supplied to the circuit so that current will flow in series through the electrical circuit. By appropriate increase or decrease in the number of rectifiers and load elements, the circuit can be adapted to various combinations of alternative, independent power sources. The total number of rectifiers required will be one less than the total number of load elements in the circuit. The composition of any individual load element can be varied to suit the needs of the device, as by using a plurality of smaller heating elements in series to make up a single load element, provided the total resistance of each load element is equal to every other load element.

A single circuit could be adapted to be used with more than two alternatives power sources, in which case it may be desirable to add other circuitry and components in a manner which will be apparent to one skilled in the art, to properly adjust the circuit to the power variance. The circuit claimed herein can be readily connected to other electrical apparatus, including thermostatic controls, without adverse effect on the operability of the circuit.

Loss of power due to the rectifiers is small and insignificant in comparison to the amount of power being supplied to the resistors.

I claim:

1. An electrical circuit configuration for producing equal power consumption by equal loads when energized selectively from multiple power sources having voltages of differing magnitudes comprising:
   a. first and second equal load elements each having a first terminal thereof connected to a first conductive lead and a second terminal thereof connected to a second conductive lead;
   b. a rectifier serially connected between said load elements in said first conductive lead;
   c. said first and second conductive leads adapted for connection selectively to a first and second power source having voltage of differing magnitudes with the ratio of voltage magnitude of said second power source to the voltage magnitude of said first power source equal to the total number of said load elements; and
   d. said rectifier connected for corresponding current flow so that when said electrical circuit configuration is energized selectively by unidirectional current from said first power source said rectifier presents a low resistance to current flow and said load elements are connected in parallel and when said circuit configuration is energized selectively by unidirectional current from said second power source said rectifier presents a high resistance to current flow and said load elements are serially connected, said load elements consuming equal power for parallel and serial connection.

2. An electrical circuit configuration as recited in claim 1 wherein said load elements are purely resistive.

3. An electrical circuit configuration as recited in claim 1 wherein said rectifier is a diode.

4. An electrical circuit configuration as recited in claim 1 further comprising:
   a. a third equal load element having a first terminal thereof connected to said first conductive lead and a second terminal thereof connected to said second conductive lead;
   b. A second rectifier serially connected between said second and third load elements in said second conductive lead; and
   c. said second rectifier also connected for corresponding unidirectional current flow through said load elements selectively in parallel from said first power source and selectively in series from said second power source.

5. An electrical circuit configuration as recited in claim 4 wherein said load elements are purely resistive.

6. An electrical circuit configuration as recited in claim 4 wherein said rectifiers are diodes.

7. An electrical circuit configuration as recited in claim 1 further comprising:
   a. a plurality of additional equal load elements each having a first terminal thereof connected to said first conductive lead and a second terminal thereof connected to said second conductive lead;
   b. a plurality of additional rectifiers, the number of said additional rectifiers being equal to the number of said additional load elements;
   c. a first one of said additional rectifiers connected in said second conductive lead and constituting an even-numbered rectifier;
   d. a second of said additional rectifiers connected in said first conductive lead and constituting an odd-numbered rectifier;
   e. one of said additional rectifiers connected between each said additional load element and the preceeding load element;
   f. said odd-numbered and even-numbered rectifiers serially connected with said load elements in said first and second conductive leads; and
   g. said additional rectifiers also connected for corresponding unidirectional current flow through said load elements selectively in parallel from said first power source and selectively in series from said second power source.

8. An electrical circuit configuration as recited in claim 7 wherein said load elements are purely resistive.

9. An electrical circuit configuration as recited in claim 7 wherein said rectifiers are diodes.

* * * * *